Figure 4:
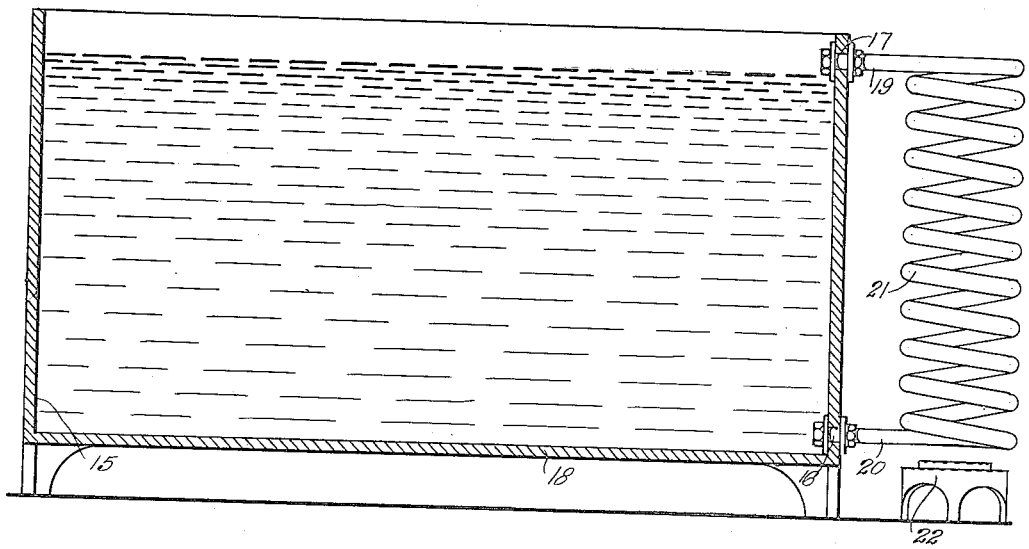

Apr. 3, 1923.
T. J. PETERS
1,450,866
METHOD OF PREPARING FRUITS AND VEGETABLES FOR SHIPMENT
Filed Aug. 8, 1918  2 sheets-sheet 1
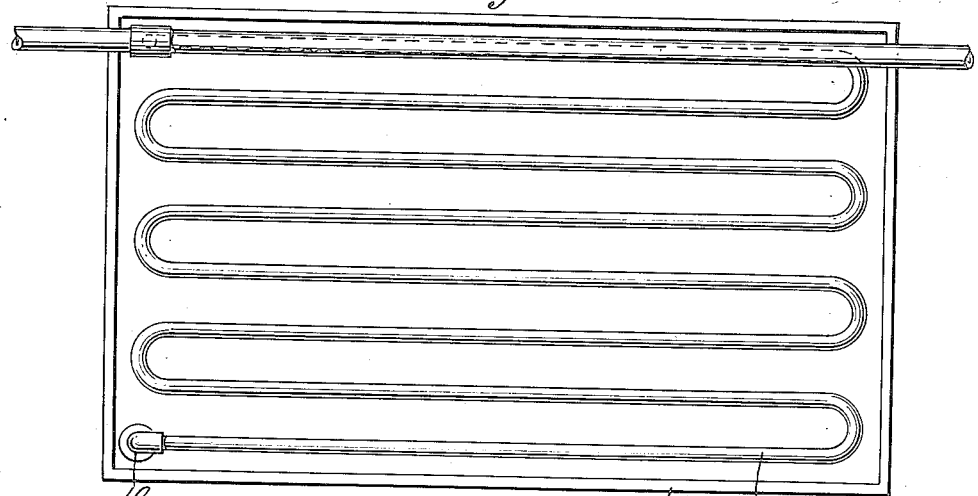
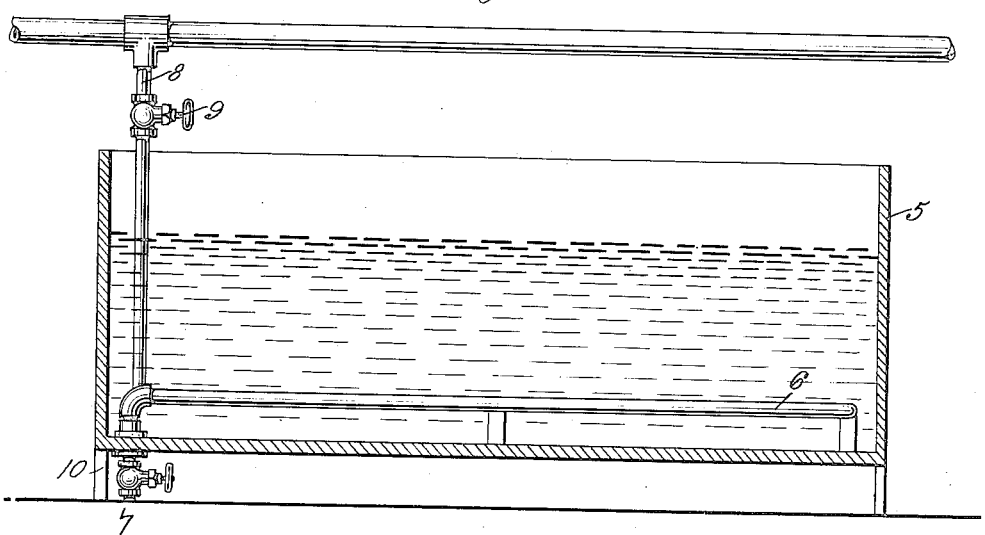
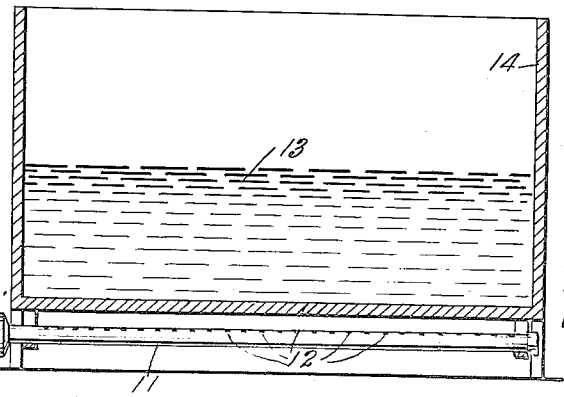
WITNESSES
Frank C. Palmer
E. B. Marshall
INVENTOR
Thomas J. Peters
BY
ATTORNEYS Apr. 3, 1923.

T. J. PETERS 1,450,866

METHOD OF PREPARING FRUITS AND VEGETABLES FOR SHIPMENT

Filed Aug. 8, 1918      2 sheets-sheet 2

Patented Apr. 3, 1923.

1,450,866

UNITED STATES PATENT OFFICE.

THOMAS JEFFERSON PETERS, OF PETERS, FLORIDA.

METHOD OF PREPARING FRUITS AND VEGETABLES FOR SHIPMENT.

Application filed August 8, 1918. Serial No. 248,923.

*To all whom it may concern:*

Be it known that I, THOMAS J. PETERS, a citizen of the United States, and a resident of Peters, in the county of Dade and State of Florida, have invented a new and Improved Method of Preparing Fruits and Vegetables for Shipment, of which the following is a full, clear, and exact description.

This invention has for its object to provide a process of treating fruits and vegetables prior to shipment to protect them from rot and other disease while in transit.

Another object of the invention is to treat fruits and vegetables with a view of hastening or retarding their maturity.

Still another object of the invention is to provide an apparatus to be used in carrying out the process.

In the shipment of fruits and vegetables, it is necessary that they be treated by some economical means which will protect them from rot and other disease while in transit to market. It is also important that the fruits and vegetables arrive at the market where they are to be sold at a predetermined stage of maturity, so that the best prices may be obtained. I have found that by immersing or washing fruits and vegetables in water, the temperature of which differs considerably from the temperature of the atmosphere, the fruits and vegetables may be protected from rot and other disease while in transit to market. When tomatoes and peaches are treated for shipment, it is preferable to keep the water in the tank at 125 degrees Fahrenheit. When citrus fruits and especially oranges and grapefruit are treated, the water should be heated to not less than 125 degrees and preferably to 130 degrees Fahrenheit. When cold water is used, the temperature should be as low as 38 degrees Fahrenheit and preferably as low as 34 degrees Fahrenheit.

It will also be understood that in order to obtain the highest prices for the fruits and vegetables, they must arrive at the market at a predetermined stage of maturity. In some cases the shipper is obliged to forward his fruit and vegetables, which are packed at a certain stage of maturity, where they will be received in a day, and in other cases where the shipment will not be received for a week. In order that the fruits and vegetables which will be placed on the market in a day may be received at the desired stage of maturity, it is necessary to treat them not only to prevent rot and disease during shipment, but also with a view of hastening their development. In cases where the fruits or vegetables at the same stage of maturity are to be shipped a week, it is necessary that they be treated not only to prevent rot and disease, but also with a view of retarding their development. In many cases where the fruits and vegetables are to be shipped a long distance, I find it advisable to treat the fruit and vegetables in cold water, so that they may be thoroughly chilled to prevent rot and disease and also to retard the maturity of the same.

In the drawings I illustrate in Figures 1 and 2 the preferred form of the apparatus used in carrying out my process, Figure 1 being a plan view of the tank and Figure 2 being a sectional elevation of Figure 1. In the bottom of this tank 5, there is a radiator 6 consisting of pipes disposed back and forth, the radiator being connected with mains by pipes 7 and 8, one of which is provided with a valve 9. The pipe 7 extends through an opening 10 in the bottom of the tank 5 and the pipe 8 extends through the top of the tank 5. In Figure 3 I illustrate another means for heating the tank, there being a pipe 11 under the tank which is provided with burners 12 which, when they are lighted, will heat the fluid 13 in the tank 14. It will, of course, be understood that the radiator 6 may be employed not only to heat the water or fluid in the tank 5 but that it may be used to introduce a refrigerating mixture into the tank to chill the fluid in the tank as may be desired.

Figure 4 illustrates a modified form of apparatus used in carrying out my process. In this apparatus the tank 15 has openings 16 and 17, the opening 16 being disposed adjacent the bottom 18 of the tank and the opening 17 being disposed adjacent the top of the tank. The terminals 19 and 20 of a coiled pipe 21 are secured in the said openings 16 and 17 and the coil pipe 21 is heated by a heater 22, so that the water will circulate from the tank 15 through the terminal 20 to the coiled pipe 21 where it will be heated and return to the tank through the terminal 19.

While fruit and vegetables may be readily treated by my process, the results are very marked for the process destroys all worms and worm eggs and kills all insects which may be on the vegetables and fruit. The treatment also destroys fungus and cleans and heals any broken places on the fruit which would otherwise rot and make the other fruit undesirable by the time the shipment reached the market. In addition, the process serves to cure the outside of the fruit and prevents sweating during shipment.

The temperature of the bath which is preferably water, should be such as will not break down the tissue of the fruit or vegetable, and the temperature must, therefore, be regulated by the kind of fruit or vegetable that is being treated. When a hot bath is used, it should be hot enough to sterilize the broken places on the fruit or vegetable and to cause the moisture to evaporate from the peeling after the fruit comes out of the bath. This cannot be done with a luke-warm temperature; the temperature must be sufficiently high to cause the peeling of the fruit or vegetable to wilt, which prevents it from going through a sweat or moistening process after it comes out of the bath and is packed.

When a temperature higher than the atmospheric temperature is used in preparing fruit for market, the temperature should be above 98°, and below the boiling point. In most cases, it has been found a temperature between 120° and 130° F. is the best.

When the fruit becomes heated by the bath it serves to wilt and toughen the outside peeling of the fruit, which, of course, is a condition of evaporation. When the fruit has been heated in this way by the bath and when it is removed therefrom, the outside peeling of the fruit becomes somewhat wilted and toughened.

In addition to what has been said above, when peaches are treated in the manner which has been set forth, it will be found that a great portion of the little stickers or fuzz normally on the outside of the peach is removed while there is still enough left to protect the general appearance of the peach, but that portion of the fuzz which remains on the peach is securely attached to the peach and does not affect the people handling the fruit, either in the packing house or in the market. As practically all of the fuzz which is only slightly attached to the peaches has been removed, the inconvenience and objections to the fuzz from the peaches in the packing houses and in the markets is remedied.

The treatment of citrus fruit is substantially the same as that which is used for the treatment of tomatoes and peaches, but it is important that only citrus fruit in a ripe state be treated by this process, inasmuch as the process has a tendency to prevent any change of color in the citrus fruit and if the fruit is at all green when treated it will not bring a good price in the market. This is so for when the citrus fruit is treated by the process set forth, it serves to toughen the outside peeling because of the wilting and the evaporation which has been described with reference to the treatment of peaches and tomatoes. The treatment of citrus fruit by the process is also a great benefit where the fruit is inclined to "crease." A "crease" in citrus fruit is the breaking of the inside pulp directly under the outside peeling and between the outside peeling and the juice cells. This break greatly impairs the value of the fruit and in many cases prevents the shipment of the fruit to market.

It will be understood that the evaporation of moisture continues after the fruit comes out of the water, and thoroughly dries the stem and blossom end of the fruit where blue mold and other fungus spores generally start, thus preventing such disease to a very great extent. It is also beneficial in the treatment of citrus fruit because it cures the outside peeling and prevents the fruit sweating.

Having thus described my invention, I claim as new and desire to secure by Letters Patent:

1. The method of treating fruit such as tomatoes, peaches and citrus fruit, which consists of immersing the fruit in water, the temperature of which is approximately 125° F. to effect a partial sterilization of the broken places on the fruit and subsequently removing the fruit from the water at which time there is a partial evaporation of the water from the peeling and the fruit is retained in its natural state for shipment.

2. The method of treating fruit such as tomatoes, peaches and citrus fruit which consists of immersing the fruit in water for a period of from 15 to 90 seconds, the temperature of the water being approximately 125° F. to effect a partial sterilization of the broken places on the fruit and subsequently removing the fruit from the water at which time there is a partial evaporation of the water from the peeling and the fruit is retained in its natural state for shipment.

THOMAS JEFFERSON PETERS.